United States Patent
Wada

(10) Patent No.: US 9,443,182 B2
(45) Date of Patent: Sep. 13, 2016

(54) CARD KEY

(71) Applicant: DENSO CORPORATION, Kariya, Aichi-pref. (JP)

(72) Inventor: Hidenori Wada, Anjo (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 7 days.

(21) Appl. No.: 14/434,154

(22) PCT Filed: Sep. 26, 2013

(86) PCT No.: PCT/JP2013/005691
§ 371 (c)(1),
(2) Date: Apr. 8, 2015

(87) PCT Pub. No.: WO2014/057620
PCT Pub. Date: Apr. 17, 2014

(65) Prior Publication Data
US 2015/0269470 A1     Sep. 24, 2015

(30) Foreign Application Priority Data

Oct. 9, 2012  (JP) ................. 2012-224211

(51) Int. Cl.
| | |
|---|---|
| G06K 19/06 | (2006.01) |
| G06K 19/07 | (2006.01) |
| E05B 19/00 | (2006.01) |
| G07C 9/00 | (2006.01) |
| B60R 25/24 | (2013.01) |
| G06K 19/077 | (2006.01) |

(52) U.S. Cl.
CPC ........... *G06K 19/0706* (2013.01); *B60R 25/24* (2013.01); *E05B 19/00* (2013.01); *E05B 19/0082* (2013.01); *G06K 19/07749* (2013.01); *G07C 9/00* (2013.01)

(58) Field of Classification Search
CPC .......... G06K 19/07749; G07F 7/1008; B42D 15/10; G06Q 20/341

USPC ..................... 235/492, 487, 382, 382.5, 380
See application file for complete search history.

(56) References Cited

U.S. PATENT DOCUMENTS

| | | |
|---|---|---|
| 2004/0185798 A1 | 9/2004 | Ohtaki et al. |
| 2006/0246851 A1 | 11/2006 | Sugimoto et al. |
| 2007/0223152 A1* | 9/2007 | Murakami .......... B29C 65/1635 361/1 |
| 2012/0012659 A1 | 1/2012 | Sugimoto et al. |

FOREIGN PATENT DOCUMENTS

| | | |
|---|---|---|
| JP | H05067055 U | 9/1993 |
| JP | 2004241896 A | 8/2004 |

(Continued)

OTHER PUBLICATIONS

International Search Report and Written Opinion (in Japanese with English Translation) for PCT/JP2013/005691, mailed Dec. 24, 2013; ISA/JP.

Primary Examiner — Karl D Frech
(74) Attorney, Agent, or Firm — Harness, Dickey & Pierce, P.L.C.

(57) ABSTRACT

A card key has a structure in which an engagement projection of a cell cover engages with an engagement recess of a card key body to fix the cell cover to the card key body. An engagement contact surface of each of the engagement recess and the engagement projection, which are engaged with each other, is provided at an angle of 90° relative to a direction of sliding of the cell cover. The card key body is provided with an escape sloped surface that allows deformation of a first side portion of the cell cover by avoiding interference with a second side portion of the cell cover, thereby to enable the cell cover to be pulled out from the card key body. Therefore, removal of the cell cover is eased. Further, even if the card key receives a shock, the cell cover is restricted from being unexpectedly detached.

8 Claims, 10 Drawing Sheets

(56) References Cited

FOREIGN PATENT DOCUMENTS

| JP | 2006307503 | A | 11/2006 |
| JP | 2007227246 | A | 9/2007 |
| JP | 2010229628 | A | 10/2010 |
| JP | 2012036715 | A | 2/2012 |

* cited by examiner

CARD KEY

CROSS REFERENCE TO RELATED APPLICATIONs

This application is a U.S. National Phase Application under 35 U.S.C. 371 of International Application No. PCT/JP2013/005691 filed on Sep. 26, 2013 and published in Japanese as WO 2014/057620 A1 on Apr. 17, 2014. This application is based on and claims the benefit of priority from Japanese Patent Application No. 2012-224211 filed on Oct. 9, 2012. The entire disclosures of all of the above applications are incorporated herein by reference.

TECHNICAL FIELD

The present disclosure relates to a card key, which for example relates to a card key functioning as an electronic key (portable device) of an automobile.

BACKGROUND ART

As a wireless transmitter receiver for a vehicle, a slim card key, which can be accommodated in a wallet, has been conventionally proposed. In response to an inquiry signal from an on-board device, the card key transmits an ID code to the on-board device, and permits lock or unlock of a vehicle door or permits to start an engine on condition that the ID code is authenticated.

As described in a patent literature 1, for example, a card key includes a card key body and a cell cover. The card key body has a cell accommodation portion to accommodate a cell as a drive source (for example, a button cell) therein to be replaceable. The cell cover closes the cell accommodation portion.

As structures of the cell cover, there are a structure as shown in FIGS. 14A and 14B and a structure as shown in FIGS. 15A and 15B. In the structure shown in shown FIGS. 14A and 14B, a cell cover 110 has an insertion projection portion 111. The insertion projection portion 111 of the cell cover 110 is inserted into a cell accommodation portion 101 of a card key body 100 to cover the cell accommodation portion 101. In the structure shown in FIGS. 15A and 15B, a cell cover 210 has a substantially U-shape in cross-section. The cell cover 210 is fixed to a card key body 200 to cover an opening 202 of a cell accommodation portion 201, thereby to close the cell accommodation portion 201.

In a fixing structure of the cell cover 110 shown in FIGS. 14A and 14B, the cell cover 110 is fixed to the card key body 100 by engaging engagement projections 112 of the cell cover 110 with engagement recesses of the card key body 100. The engagement projections 112 have a triangular shape and are disposed at opposite side surfaces of the insertion projection portion 111. The engagement recesses 102 have a triangular shape in cross section and are provided on opposite inner side walls of the cell accommodation portion 101. In a fixing structure of the cell cover 210 shown in FIGS. 15A to 15C, the cell cover 210 is fixed to the card key body 200 by engaging engagement projections 212 of the cell cover 210 with engagement recesses 203 of the cell accommodation portion 201. The engagement projections 212 are provided to project from inner walls of up and down side portions 211 of the cell cover 210, which has the U-shape in cross-section. The engagement projections 212 have a trapezoidal shape in cross section. The engagement recesses 203 are provided at positions adjacent to the opening 202 of the cell accommodation portion 201, and have a trapezoidal shape in cross section. Sloped surfaces of the engagement projections 212 and the engagement recesses 203, which correspond to sloped sides of the trapezoidal shape, define a gently sloped angle to enable the cell cover 210 to be pulled out from the card key body 200 in a state of being pinched.

However, in the structure where the cell cover is fixed to the card key body by the engagement of such engagement projections and engagement recesses, if an engagement force is large, it is difficult to remove the cell cover. On the other hand, if the engagement force is small, the cell cover will be unexpectedly removed from the card key body by a shock, such as a shock caused when the card key is dropped or the like.

PRIOR ART LITERATURE

Patent Literature

PATENT LITERATURE 1: JP 2012-36715 A

SUMMARY OF INVENTION

It is an object of the present disclosure to provide a card key in which removal of a cell cover is eased, and which is capable of avoiding the cell cover from being unexpectedly removed when receiving a shock.

According to an aspect of the present disclosure, a card key includes a card key body and a cell cover. The card key body includes a circuit board on which an electronic component for performing a wireless communication with an on-board device is mounted, a cell accommodation portion for accommodating a cell that supplies an electric power to the circuit board, and a body engagement portion. The cell cover is disposed to open and close the cell accommodation portion, and is detachable by being slid relative to the card key body.

The cell cover has a U-shape in cross-section, and includes a first side portion, a second side portion, and a connecting portion connecting the first side portion and the second side portion. The first side portion is deformable. The second side portion is provided with a cover engagement portion on an opposed surface thereof opposed to the card key body. The cover engagement portion engages with the body engagement portion of the card key body.

An engagement contact surface of each of the main engagement portion and the cover engagement portion defines an angle in a range of 90°±45° relative to a direction of sliding of the cell cover in a mutually engaged state. The card key body is provided with an interference escape portion that allows deformation of the first side portion by avoiding an interference with the second side portion in the state where the cell cover is attached to the card key body thereby to enable the cell cover to be pulled out from the card key body.

In the card key described above, the cell cover is fixed to the card key body by engagement of the cover engagement portion of the cell cover and the body engagement portion of the card key body. The engagement contact surface of each of the cover engagement portion and the body engagement portion, which are engaged with each other, is the surface extended at the angle in the range of 90°±45° relative to the direction of sliding of the cell cover. Therefore, even if the cell cover receives a strong force in a direction of pulling-out of the cell cover due to a strong shock, such as when the card key is dropped, the cell cover is restricted from being unexpectedly removed. On the removal of the cell cover from the card key body, the first side portion is deformed in a direction to disengage the cover engagement portion of the second side portion from the body engagement portion of the card key body. In this state, the cell cover is pulled out. As a result, the removal of the cell cover is eased.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, a first embodiment, which is an embodiment of a card key of the present disclosure, will be described with reference to the drawings.

Figure 1:
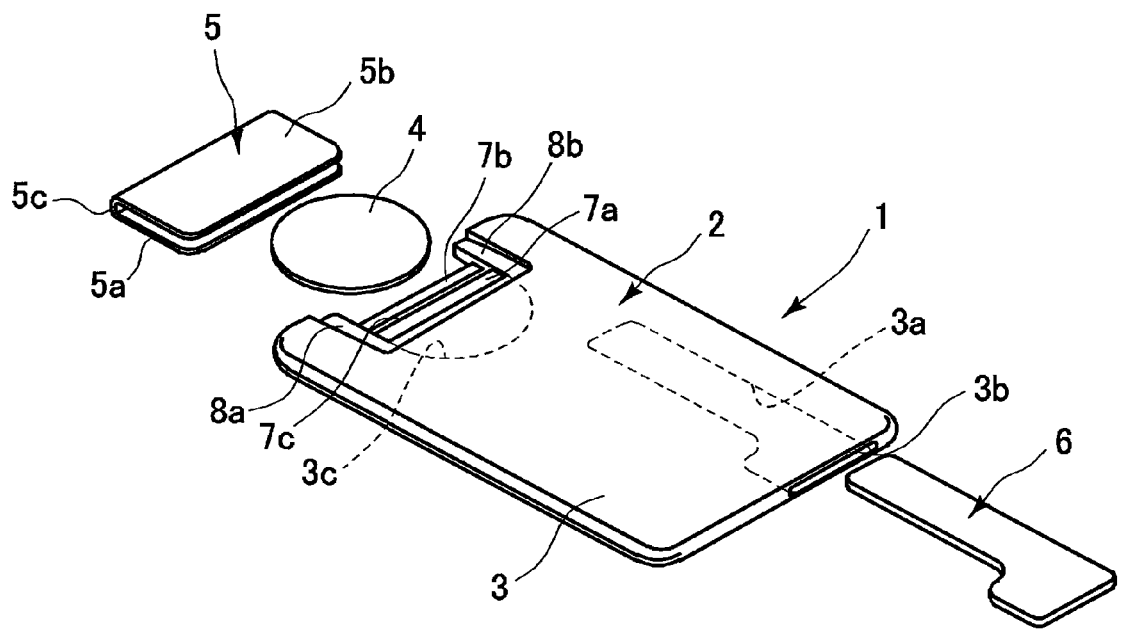
FIG. 1 is a diagram illustrating an exploded perspective view of a card key according to a first embodiment of the present disclosure.
Figure 2:
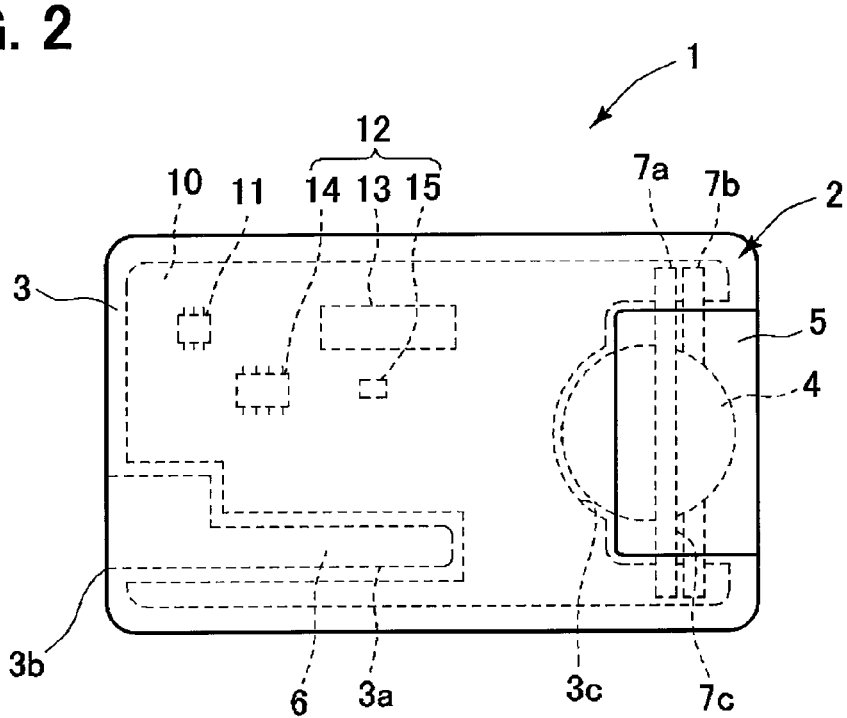
FIG. 2 is a diagram illustrating a plan view of the card key shown in FIG. 1 according to the first embodiment.

As shown in FIGS. 1 and 2, the card key 1 of the first embodiment includes a card key body 2, a button-type cell 4, a cell cover 5, and a mechanical key 6. The card key body 2 is configured such that a circuit board 10 on which an electronic component for performing a wireless communication with an on-board device (not shown) is mounted is integrally covered with a case (resin case 3) made of a resin material. The button-type cell 4 is a cell to supply an electric power to the circuit board 10. The cell cover 5 is detachable from the card key body 2 by being slid. The cell cover 5 restricts the button-type cell 4 from dropping out from the card key body 2. The mechanical key 6 is for a manual operation.

As shown in FIG. 2, the electronic component 12 is mounted on a mounting surface 11 of the circuit board 10, which defines one side of the circuit board 10. The electronic component 12 is for transmitting a response signal for responding to an identification code (ID code) request signal transmitted from the vehicle to the card key 1. The electronic component 12 includes an antenna 13, a package integrated circuit (package IC) 14, another component 15, and the like.

The mechanical key 6 is an emergency key that is used when the button-type cell 4 is dead or when a malfunction of the card key 1 is considered. The mechanical key 6 is a metal plate having a substantially L-shape, and is made by pressing or the like. The mechanical key 6 is accommodated in a mechanical key accommodation portion 3a formed inside of the resin case 3. The mechanical key accommodation portion 3a is formed with a mechanical key insertion opening 3b at an end. The mechanical key 6 is inserted into the mechanical key accommodation portion 3a through the mechanical key insertion opening 3b and is accommodated in the mechanical key accommodation portion 3a.

The resin case 3, which constitutes the card key body 2, is for example made of a high intensity resin material such as an epoxy resin (EP), and has a long thin plate shape. The mechanical key insertion opening 3b of the mechanical key accommodation portion 3a is formed at an end of the resin case 3 with respect to a longitudinal direction. The resin case 3 is formed with a cell accommodation portion 3c at the other end with respect to the longitudinal direction. The cell accommodation portion 3c is for accommodating the button-type cell 4 inside of the card key body 2. On a side to which the cell accommodation portion 3c opens, a pair of upper and lower cell terminals 7a, 7b is provided to electrically connect the electronic component 12 disposed on the circuit board 10 and the button-type cell 4 to each other. A space between the cell terminal 7a and the cell terminal 7b forms a cell insertion opening 7c for inserting the button-type cell 4 into the cell accommodation portion 3c.

Figure 3:
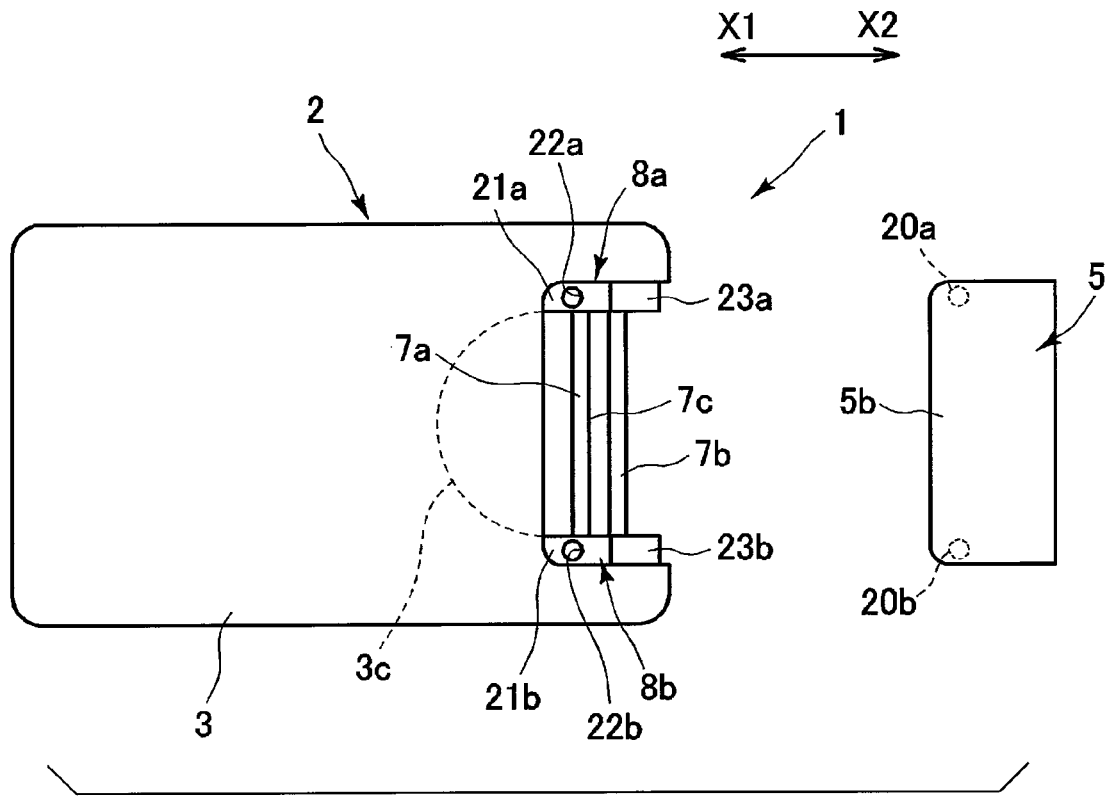
FIG. 3 is a diagram illustrating a plan view of the card key in a state where a cell cover is removed from a card key body according to the first embodiment.

The cell terminal 7a is a positive-side terminal that contacts with a positive pole of the button-type cell 4, and the cell terminal 7b is a negative-side terminal that contacts with a negative pole of the button-type cell 4. The cell terminals 7a, 7b are formed into a bent shape so that middle portions thereof are spaced from each other to define a clearance slightly smaller than the thickness of the button-type cell 4. As shown in FIG. 3, the resin case 3 is formed with cover fixing portions 8a and 8b at ends of the cell terminals 7a and 7b, that is, at ends of the cell insertion opening 7c. The cover fixing portions 8a and 8b are formed into a stepped shape so as to make an outer surface of the cell cover 5 coplanar with an outer surface of the card key body 2 (resin case 3) in a state where the cell cover 5 is attached to the card key body 2.

Figure 4:
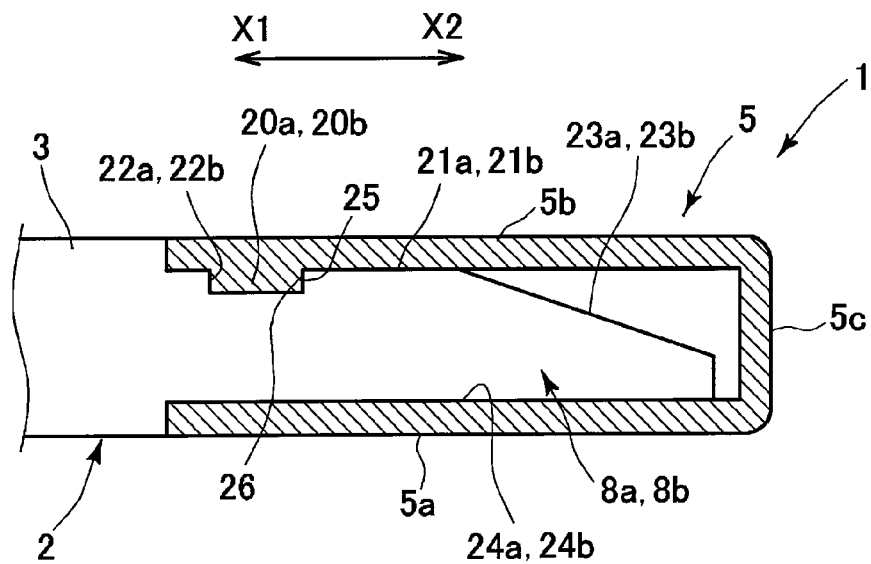
FIG. 4 is a diagram illustrating a partial cross-sectional view in an engaged state of an engagement projection of the cell cover and an engagement recess of the card key body according to the first embodiment.
Figure 5:
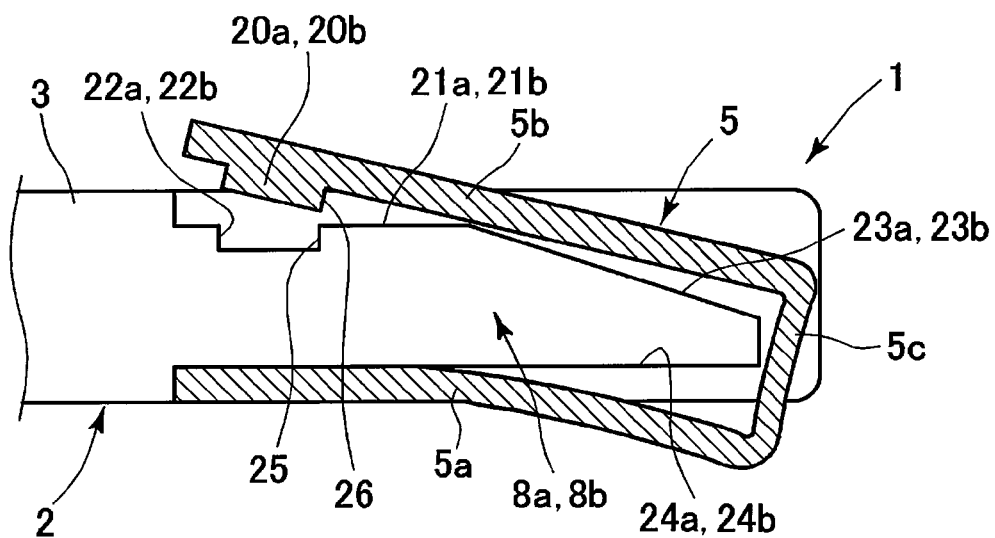
FIG. 5 is a diagram illustrating a partial cross-sectional view in a disengaged state of the engagement projection of the cell cover from the engagement recess of the card key body according to the first embodiment.

Upper surfaces of base portions of the cover fixing portions 8a and 8b, that is, upper surfaces of the cover fixing portions 8a and 8b adjacent to the cell accommodation portion 3c are parallel to a direction X1-X2 of sliding of the cell cover 5, and are provided as upper contact surfaces 21a and 21b (contact surfaces) that contact with an inner wall surface of a second side portion 5b of the cell cover 5 in the state where the cell cover 5 is attached to the card key body 2. The upper contact surfaces 21a and 21b are respectively formed with engagement recesses 22a and 22b as body engagement portions. The engagement recesses 22a and 22b have a circular shape in a planar view. The engagement recesses 22a and 22b are recessed to engage with engagement projections 20a and 20b, which will be described later. As shown in FIGS. 4 and 5, the cover fixing portions 8a and 8b are formed with escape sloped surfaces 23a and 23b on the upper side of the ends thereof as interference escape portions. The escape sloped surfaces 23a and 23b are sloped down toward the end. Lower surfaces of the cover fixing portions 8a and 8b are entirely parallel to the direction X1-X2 of sliding of the cell cover 5. The lower surfaces of the cover fixing portions 8a and 8b are formed as lower contact surfaces 24a and 24b that contact with an inner wall surface of a first side portion 5a of the cell cover 5 in the state where the cell cover 5 is attached to the card key body 2.

Figure 6:
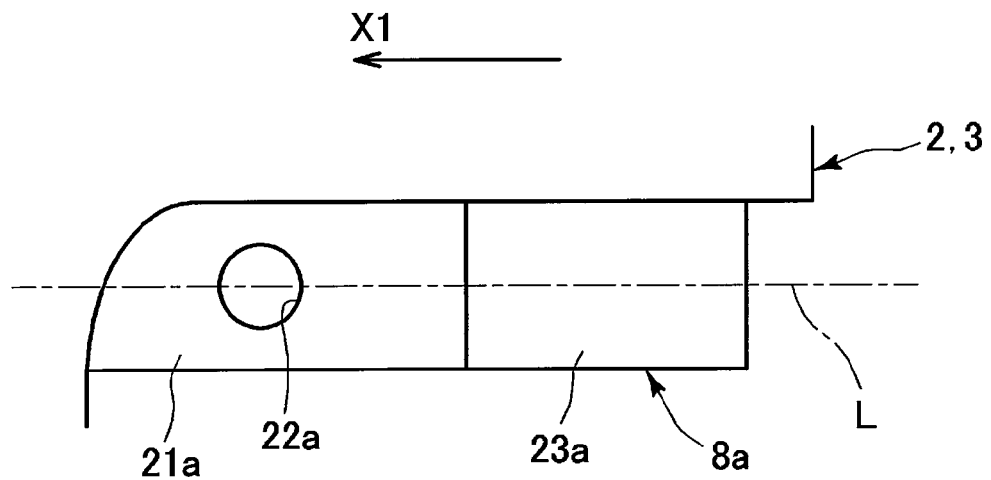
FIG. 6 is a diagram illustrating a plan view for indicating a positional relationship between the engagement recess and an escape sloped surface of the card key body according to the first embodiment.

As shown in FIG. 6, the engagement recess 22a of the cover fixing portion 8a is arranged on an extended line L of the escape sloped surface 23a along a direction X1 of slide-attaching of the cell cover 5. Although not illustrated, similarly, the engagement recess 22b of the cover fixing portion 8b is arranged on the extended line L of the escape sloped surface 23b along the direction X1 of slide-attaching of the cell cover 5. In other words, the engagement recesses 22a and 22b are arranged on the straight lines L1 that pass through the escape sloped surfaces 23a and 23b and are parallel to the direction X1 of slide-attaching of the cell cover 5.

The cell cover 5 is formed into a U-shape in cross-section, and includes the first side portion 5a as a lower side portion, the second side portion 5b as an upper side portion, and a connecting side portion 5c connecting the first side portion 5a and the second side portion 5b. The cell cover 5 is detachably disposed to the card key body 2 by being slid relative to the card key body 2 to open and close the cell accommodation portion 3c (cell insertion opening 7c). The second side portion 5b is formed with engagement projections 20a and 20b as cover engagement portions correspondingly engaging with the engagement recesses 22a and 22b. The engagement projections 20a and 20b project from a surface of the second side portion 5b opposed to the cover fixing portions 8a and 8b of the card key body 2, that is, an inner wall surface of the second side portion 5b at ends in a width direction of the second side portion 5b perpendicular to the direction X1-X2 of sliding of the cell cover 5. The engagement recesses 22a and 22b have a circular shape in a planar view.

The cell cover 5 is made of a material having a high bending elastic modulus and a high intensity (for example, a resin material such as ABS or polycarbonate, a metal material such as stainless steel), so that each of the first and second side portions 5a and 5b and the connecting portion 5c, which form the U-shape in cross-section, is deformable.

The engagement recesses 22a and 22b of the card key body 2 and the engagement projections 20a and 20b of the cell cover 5, which are engaged with each other to fix the cell cover 5 to the card key body 2, form engagement contact surfaces 25 and 26 on the side facing in a direction X2 of pulling-out of the cell cover 5 (see FIGS. 4 and 5). The engagement contact surface 26 of each of the engagement projections 20a and 20b is perpendicular (90°) to the direction X1-X2 of sliding of the cell cover 5 in an engaged state with the engagement contact surface 25. Although not illustrated, similarly to and correspondingly to the engagement contact surface 26, the engagement contact surface 25 of each of the engagement recesses 22a and 22b is perpendicular (90°) to the direction X1-X2 of sliding of the cell cover 5 in an engaged state with the engagement contact surface 26.

Next, operations to attach and detach the cell cover 5 to and from the card key body 2 in the card key 1 of the first embodiment for replacing the button-type cell 4 will be described. In the state where the cell cover 5 is attached to the card key body 2, as shown in FIG. 4, the engagement projections 20a and 20b of the cell cover 5 are correspondingly received in the engagement recesses 22a and 22b. Therefore, even if the card key 1 receives a strong force in the direction (direction X2) of pulling-out of the cell cover 5, due to the shock, such as when being dropped, the fixed state of the cell cover 5 can be firmly maintained by contact-engagement of the engagement contact surfaces 25 and the engagement contact surfaces 26, which are the surfaces perpendicular to the direction X1-X2 of sliding of the cell cover 5. Therefore, the cell cover 5 is restricted from being unexpectedly removed from the card key body 2.

In the attached state of the cell cover 5, the inner wall surface of the first side portion 5a, which is on the lower side of the cell cover 5, contacts the lower contact surfaces 24a and 24b of the card key body 2, and the second side portion 5b, which is on the upper side of the cell cover 5, contacts the upper contact surfaces 21a and 21b. Therefore, it is less likely that the cell cover 5 will rattle relative to the card key body 2. Further, the cell cover 5 is firmly fixed to the card key body 2. Moreover, the engagement projections 20a and 20b, which are provided as the cover engagement portions in the cell cover 5, are disposed at two positions, that is, at the ends in the width direction perpendicular to the direction X1-X2 of sliding of the cell cover 5. Therefore, it is less likely that a lifting will occur at the ends of the cell cover 5.

To remove the cell cover 5 from the card key body 2 so as to remove the old button-type cell 4 from the card key 1, the cell cover 5 is pinched so that the side portions 5a and 5b of the cell cover 5 are held in the up and down direction. In this state, the lower first side portion 5a is deformed so that the end of the upper second side portion 5b is pushed upwardly, as shown in FIG. 5. In this case, the portion of the second side portion 5b adjacent to the connecting portion 5c is pushed and moved downwardly opposite from the end portion. The pushing down of the portion of the second side portion 5b adjacent to the connecting portion 5c, that is, the deformation of the first side portion 5a is allowed due the escape sloped surfaces 23a and 23b of the cover fixing portions 8a and 8b avoiding interference with the second side portion 5b.

When the end portion of the second side portion 5b is further pushed upward by the deformation of the first side portion 5a, the engagement projections 20a and 20b of the cell cover 5 are moved in directions to be disengaged from the engagement recesses 22a and 22b of the card key body 2. After the engagement projections 20a and 20b are disengaged from the engagement recesses 22a and 22b by the deformation of the first side portion 5a, the cell cover 5 is slid in the direction X2 of pulling-out of the cell cover 5 from this state. As a result, the cell cover 5 is removed from the card key body 2.

Thereafter, the old button-type cell 4 is taken out from the cell accommodation portion 3c. After new button-type cell 4 is inserted into the cell accommodation portion 3c, the cell cover 5 is fixed to the card key body 2. As a procedure of fixing the cell cover 5, the second side portion 5b having the engagement projections 20a and 20b on the inner wall surface thereof is opposed to the upper surfaces of the cover fixing portions 8a and 8b formed with the engagement recesses 22a and 22b. In this state, the cell cover 5 is slid in the direction X1 of slide-attaching of the cell cover 5 so that the cover fixing portions 8a and 8b are interposed between the first side portion 5a and the second side portion 5b. Finally, when the engagement projections 20a and 20b are respectively received in the engagement recesses 22a and 22b, the fixing of the cell cover 5 to the card key body 2 is finished.

In slide-attaching of the cell cover 5 described above, the escape sloped surfaces 23a and 23b formed on the upper surfaces of the ends of the cover fixing portions 8a and 8b guide the sliding of the engagement projections 20a and 20b along the upper surfaces of the cover fixing portions 8a and 8b, thereby to ease the fixing operation of the cell cover 5. Further, as described above, the engagement recesses 22a and 22b, which are engaged with the engagement projections 20a and 20b, are arranged on the extended lines L of the escape sloped surfaces 23a and 23b (the straight lines passing through the escape sloped surfaces 23a and 23b and are parallel to the direction X1 of slide-attaching of the cell cover 5). Therefore, the engagement projections 20a and 20b sliding along the escape sloped surfaces 23a and 23b are directly placed into the engagement recesses 22a and 22b. Therefore, the slide-attaching of the cell cover 5 is smooth.

As described above, in the card key 1 of the first embodiment, the cell cover 5 is fixed to the card key body 2 by the engagement of the engagement projections 20a and 20b of the cell cover 5 and the engagement recesses 22a and 22b of the card key body 2. Each of the engagement contact surfaces 25 and 26 of the engagement recesses 22a and 22b and the engagement projections 20a and 20b, which are engaged with each other, is the surface defining an angle of 90° relative to direction X1-X2 of sliding of the cell cover 5 in the mutually engaged state. Therefore, even if the cell cover 5 receives a strong force in the direction (direction X2) of pulling-out of the cell cover 5 due to the shock, such as when the card key 1 is dropped, it is less likely that the cell cover 5 will be unexpectedly removed. On the other hand, on the removal of the cell cover 5 from the card key body 2, the operation to deform the first side portion 5a in the direction to disengage the engagement projections 20a and 20b of the second side portion 5b from the engagement recesses 22a and 22b of the card key body 2 is performed, and the cell cover 5 is pulled out in this state. Therefore, the removal of the cell cover 5 is eased.

Figure 7:
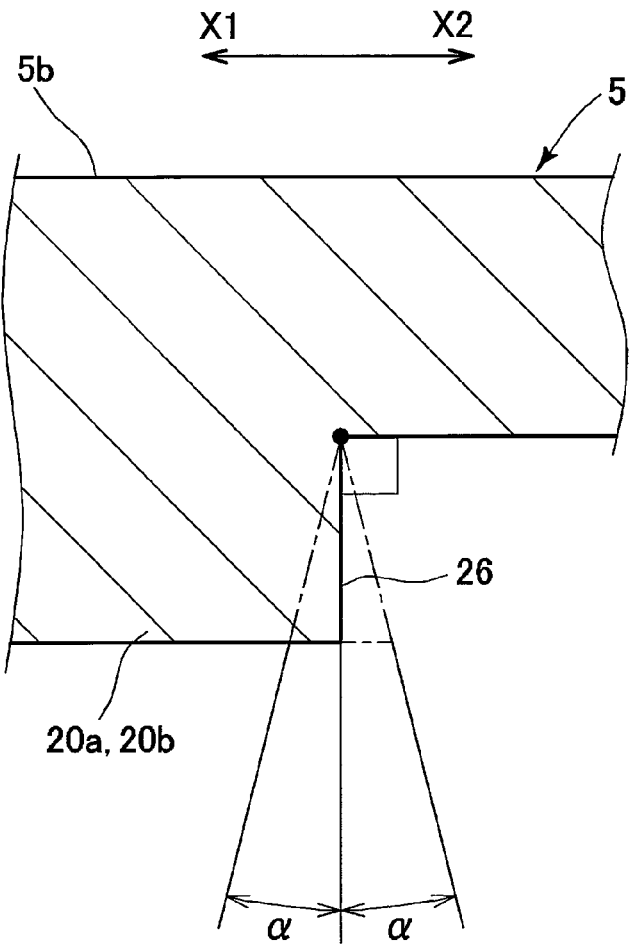
FIG. 7 is a diagram illustrating an enlarged cross-sectional view of a part of an engagement contact surface of the engagement projection according to the first embodiment.

In the first embodiment, the engagement contact surfaces 25 and 26 are perpendicular (90°) to the direction X1-X2 of sliding of the cell cover 5. However, the engagement contact surfaces 25 and 26 are not limited to such a structure. Namely, the engagement contact surface of each of the body engagement portion and the cover engagement portion may be a surface extending at an angle of approximately 90° relative to the direction of sliding of the cell cover in the mutually engaged state. In particular, when an angle α shown in FIG. 7 is defined as 45°, the engagement contact surfaces 25 and 26 may be surfaces extending at an angle in a range of 90°±45° (surfaces indicated by dashed chain lines in FIG. 7) relative to the direction X1-X2 of sliding of the cell cover 5 (for example, a direction parallel to a planar direction of the mounting surface 11). However, to surely avoid the cell cover 5 from being removed due to a strong shock while easing the removal operation of the cell cover 5, it is preferable that the engagement contact surfaces 25 and 26 are surfaces extending at an angle in a range of 90°±30° relative to the direction X1-X2 of sliding of the cell cover 5. It is more preferable that the engagement contact surfaces 25 and 26 are surfaces perpendicular (90°) to direction X1-X2 of sliding of the cell cover 5 described in the embodiment.

In the first embodiment, when the cell cover 5 is removed from the card key body 2, the cell cover 5 is pulled out in the state where the engagement projections 20a and 20b are completely disengaged from the engagement recesses 22a and 22b. In this configuration, the engagement projections 20a and 20b are disengaged since the escape sloped surfaces 23a and 23b of the cover fixing portions 8a and 8b allow the deformation of the first side portion 5a by avoiding interference with the second side portion 5b. Namely, the cover engagement portions according to the present disclosure are configured to be disengaged from the body engagement portion in the state where the inner wall surface of the second side portion and the escape sloped surface are in surface-contact with each other. For this reason, the removal of the cell cover is smoothly performed.

Figure 8:
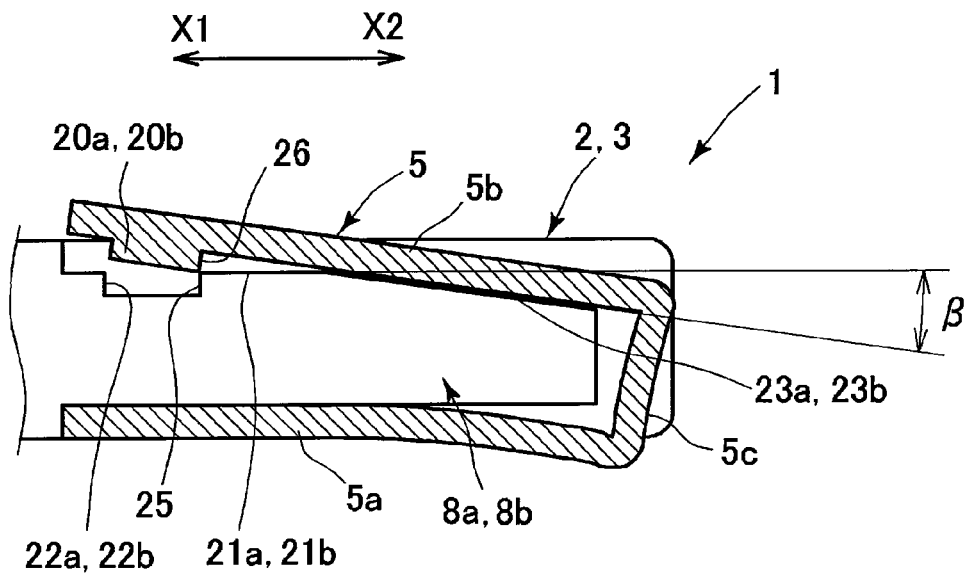
FIG. 8 is a diagram illustrating a partial cross-sectional view of the escape sloped surface of the card key body according to a modification of the first embodiment.

However, it is not necessarily limited to the configuration described above. As shown in FIG. 8, for example, the operation of pulling out the cell cover 5 may be performed in a state where the inner wall surface of the second side portion 5b is in surface-contact with the escape sloped surfaces 23a and 23b, and the engagement of the engagement projections 20a and 20b and the engagement recesses 22a and 22b slightly remains (the end portion of the engagement contact surface 26 is engaged with the end portion of the engagement contact surface 25). In this case, the second side portion 5b is deformed in accordance with the operation of pulling out the cell cover 5, and thereby the engagement projections 20a and 20b are completely disengaged from the engagement recesses 22a and 22b. As a result, the cell cover 5 can be removed.

It is to be noted that a sloped angle β of the escape sloped surfaces 23a and 23b relative to the direction X1-X2 of sliding of the cell cover 5 may be any angle in a range from 5° to 45° considering the configuration where the engagement between the engagement projections 20a and 20b and the engagement recesses 22a and 22b slightly remains in the state where the inner wall surface of the second side portion 5b and the escape sloped surfaces 23a and 23b are in surface-contact with each other, as shown in FIG. 8.

Hereinabove, the embodiment of the present disclosure is described as the first embodiment. However, the embodiment is an example, and the present disclosure is not limited to the embodiment described above. In the embodiment described above, various modifications, such as elimination of a part of structural elements or addition of another structural element, can be made based on the knowledge of a person having ordinary skill in the art. It is true also for second to fourth embodiments described hereinafter.

Hereinafter, the second to fourth embodiments, which are different from the embodiment described above (the first embodiment), will be described. It is to be noted that a structural element common in that of the embodiment described above is designated with the same reference number, and a description thereof will be omitted.

Figure 9:
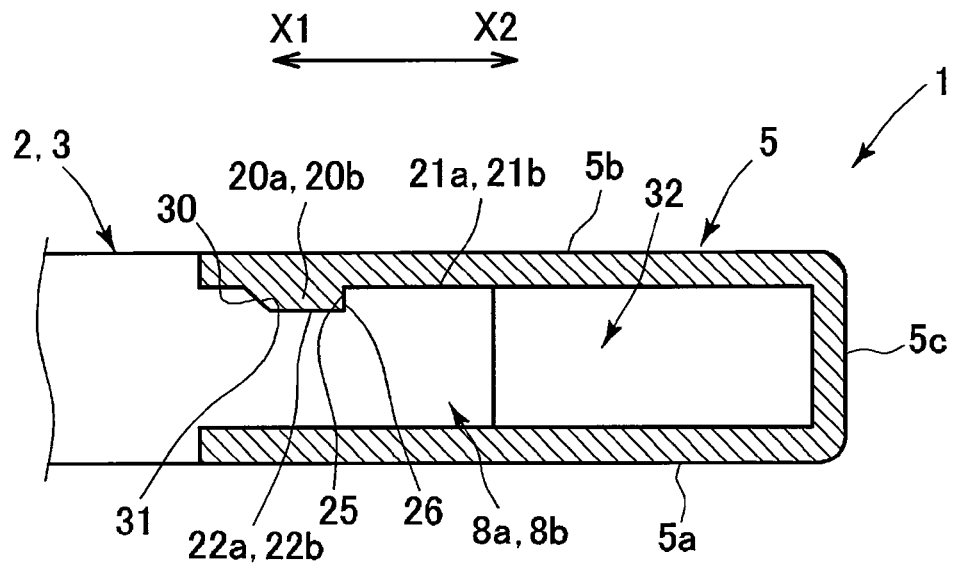
FIG. 9 is a diagram illustrating a partial cross-sectional view in an engaged state of an engagement projection of a cell cover and an engagement recess of a card key body of a card key according to a second embodiment of the present disclosure.
Figure 10:
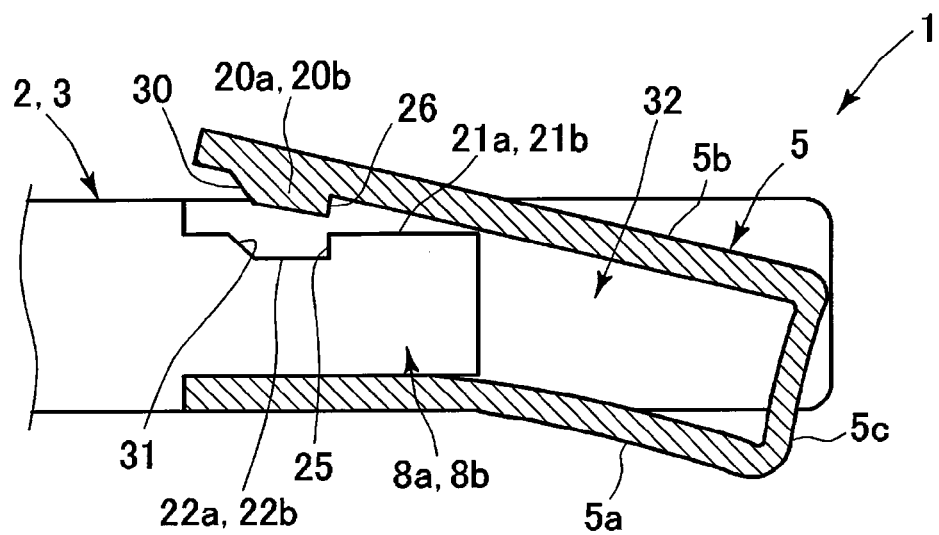
FIG. 10 is a diagram illustrating a partial cross-sectional view in a disengaged state of the engagement projection of the cell cover from the engagement recess of the card key body according to the second embodiment.

As shown in FIGS. 9 and 10, in a structure of the second embodiment, similarly to the first embodiment, the surfaces of the engagement projections 20a and 20b formed on the inner wall surface of the second side portion 5b of the cell cover 5 facing in the direction X2 of pulling-out of the cell cover 5 are formed as the engagement contact surface 26 engaging with the engagement contact surface 25 of the card key body 2. On the other hand, the surfaces of the engagement projections 20a and 20b facing in the direction opposite to the direction X2 of pulling-out of the cell cover 5, that is, the surfaces of the engagement projections 20a and 20b facing in the direction X1 of slide-attaching of the cell cover 5 are inclined relative to the direction X1-X2 of sliding of the cell cover 5, as guiding sloped surfaces 30 guiding the slide-attaching of the cell cover 5. Further, the engagement recesses 22a and 22b of the card key body 2 are formed with receiving sloped surfaces 31 corresponding to the guiding sloped surfaces 30.

In the second embodiment, the portions of the cover fixing portions 8a and 8b of the card key body 2 toward the tip end from the upper contact surfaces 21a and 21b on which the engagement recesses 22a and 22b are formed, that is, the portions where the escape sloped surfaces 23a and 23b are formed as the structure of the first embodiment are eliminated so as to provide an escape space 23. The escape space 32 is provided to avoid interference with the second side portion 5b and to allow the deformation of the first side portion 5a when the cell cover 5 is removed.

Accordingly, in the structure of the second embodiment, when the cell cover 5 is removed from the card key body 2, the cell cover 5 is pinched from the state shown in FIG. 9 to push down the portion of the second side portion 5b adjacent to the connecting portion 5c toward the escape space 32. Therefore, as shown in FIG. 10, the engagement projections 20a and 20b are disengaged from the engagement recesses 22a and 22b. In this state, the cell cover 5 is slid in the direction X2 of pulling-out of the cell cover 5 to remove from the card key body 2.

On the other hand, when the cell cover 5 is fixed to the card key body 2, the second side portion 5b is opposed to the upper surfaces of the cover fixing portions 8a and 8b on which the engagement recesses 22a and 22b are formed. In this state, the cell cover 5 is slid in the direction X1 of slide-attaching of the cell cover 5 so that the cover fixing portions 8a and 8b are interposed between the first and second side portions 5a and 5b, and the engagement projections 20a and 20b are respectively received in the engagement recesses 22a and 22b. As a result, the cell cover 5 is fixed to the card key body 2. In the second embodiment, the escape sloped surfaces 23a and 23b for guiding the slide-attaching of the cell cover 5 are not provided in the card key body 2. Instead, the guiding sloped surfaces 30 are provided on the engagement projections 20a and 20b of the cell cover 5, and guide the slide-attaching of the cell cover 5 to enable the smooth fixing operation of the cell cover 5.

Figure 11:
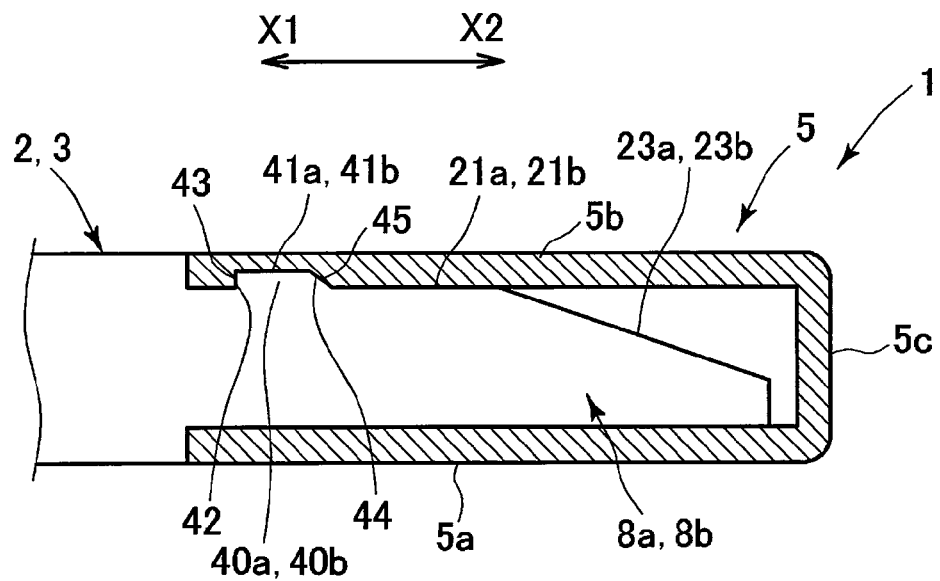
FIG. 11 is a diagram illustrating a partial cross-sectional view in an engaged state of an engagement projection of a cell cover and an engagement recess of a card key body of a card key according to a third embodiment of the present disclosure.
Figure 12:
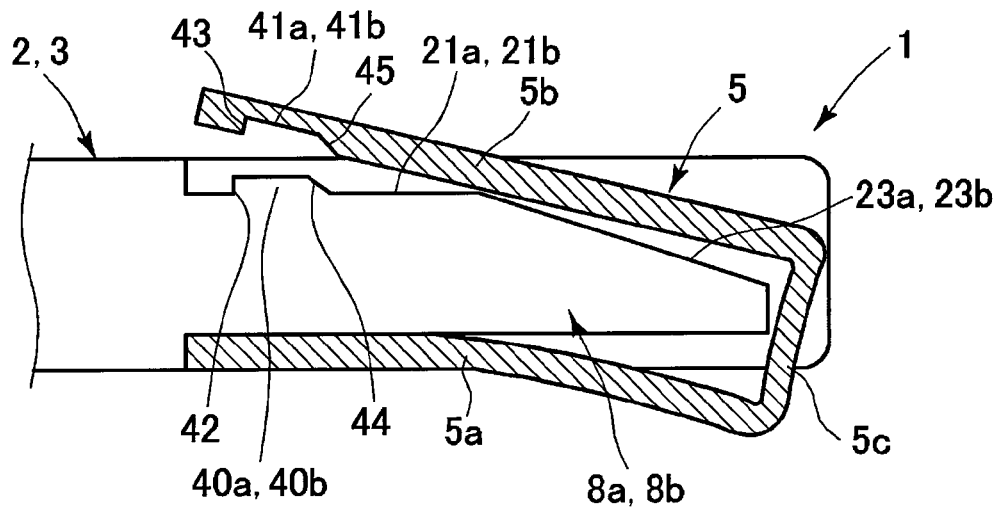
FIG. 12 is a diagram illustrating a partial cross-sectional view in a disengaged state of the engagement projection of the cell cover from the engagement recess of the card key body according to the third embodiment.

As shown in FIGS. 11 and 12, in a structure of the third embodiment, the cover fixing portions 8a and 8b of the card key body 2 are formed with engagement projections 40a and 40b having a shape of projection as the body engagement portions, and the inner wall surface of the second side portion 5b of the cell cover 5 is formed with engagement recesses 41a and 41b having a shape of recess as the cover engagement portions. Further, surfaces of the engagement projections 40a and 40b and the engagement recesses 41a and 41b facing the direction X1 of slide-attaching of the cell cover 5 are perpendicular (90°) to the direction X1-X2 of sliding of the cell cover 5 in the mutually engaged state to provide engagement contact surfaces 42 and 43.

In the engagement projections 40a and 40b providing the body engagement portions of the third embodiment, the surface opposite to the engagement contact surface 42 and facing in the direction X2 of pulling-out of the cell cover 5 is sloped relative to the direction X1-X2 of sliding of the cell cover 5 to provide a guiding sloped surface 44 for guiding the slide-attaching of the cell cover 5. The engagement recesses 41a and 41b of the cell cover 5 are formed with receiving sloped surfaces 45 corresponding to the guiding sloped surfaces 44.

Accordingly, in the structure of the third embodiment, when the cell cover 5 is removed from the card key body 2, the cell cover 5 is pinched in the state shown in FIG. 11 to push down the portion of the second side portion 5b adjacent to the connecting portion 5c. As shown in FIG. 12, therefore, the engagement recesses 41a and 41b of the cell cover 5 are disengaged from the engagement projections 40a and 40b of the card key body 2. In this state, the cell cover 5 is slid in the direction X2 of pulling-out of the cell cover 5 and removed from the card key body 2.

On the other hand, when the cell cover 5 is fixed to the card key body 2, the second side portion 5b is opposed to the upper surfaces of the cover fixing portions 8a and 8b on which the engagement projections 40a and 40b are formed. In this state, the cell cover 5 is slid in the direction X1 of slide-attaching of the cell cover 5 so that the cover fixing portions 8a and 8b are interposed between the first side portion 5a and the second side portion 5b, and the engagement recesses 41a and 41b are engaged with the engagement projections 40a and 40b, respectively. As a result, the cell cover 5 is fixed to the card key body 2. In the third embodiment, the guiding sloped surfaces 44 formed on the engagement projections 40a and 40b of the card key body 2 guide the slide-attaching of the cell cover 5 to enable the smooth attachment operation of the cell cover 5.

In the third embodiment, as the cover engagement portions engaging with the engagement projections 40a and 40b of the card key body 2, the second side portion 5b of the cell cover 5 has the engagement recesses 41a and 41b having the shape of recess. The shape of the cover engagement portions is not limited to the recessed shape. The cover engagement portions may have hole shapes passing through the second side portion 5b in the up and down direction.

Figure 13:
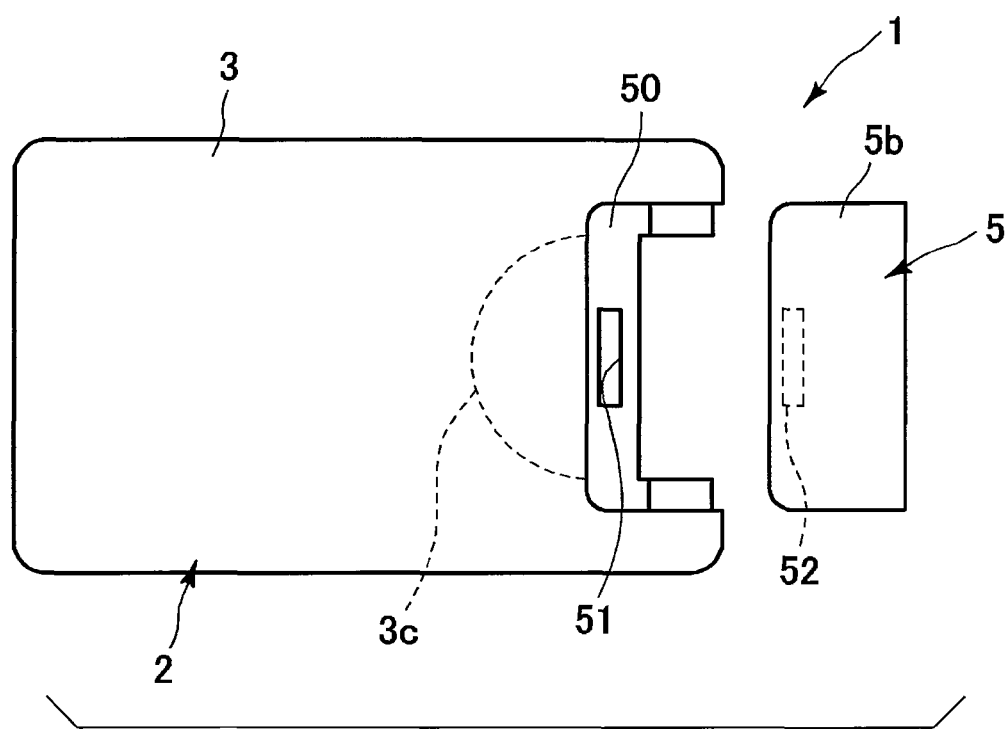
FIG. 13 is a diagram illustrating a plan view of a cell cover and a card key body of a card key according to a fourth embodiment of the present disclosure.
Figure 14A:
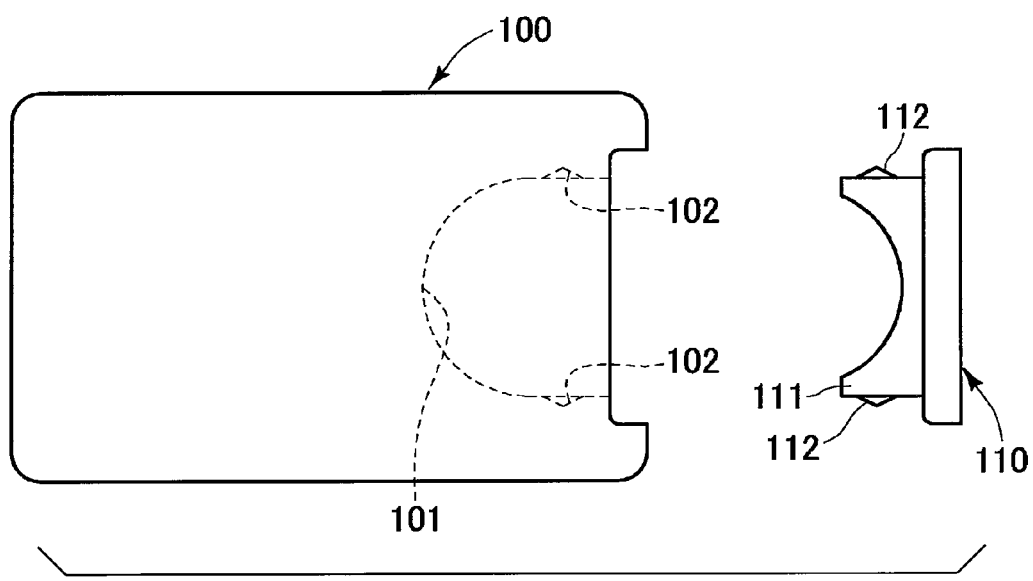
FIG. 14A is a diagram illustrating a plan view of a card key body and a cell case of a card key as a related art.
Figure 14B:
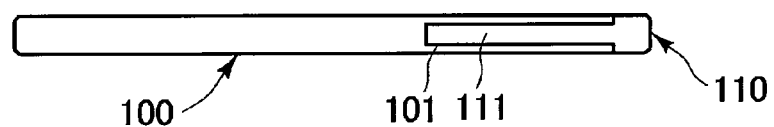
FIG. 14B is a schematic diagram illustrating a side view of the card key shown in FIG. 14A.
Figure 15A:
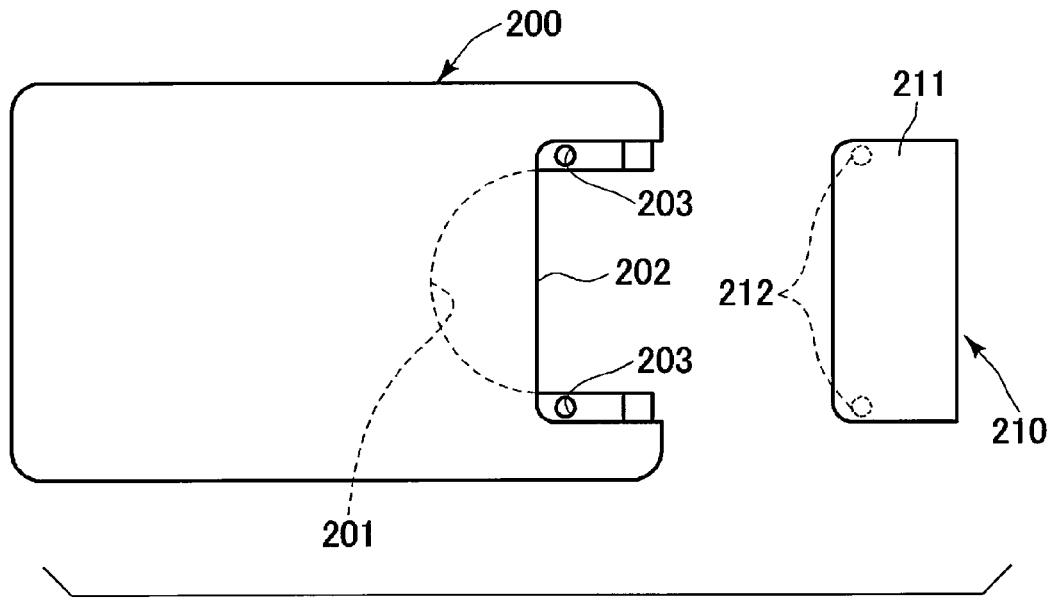
FIG. 15A is a diagram illustrating a plan view of a card key body and a cell case of a card key as a related art.
Figure 15B:
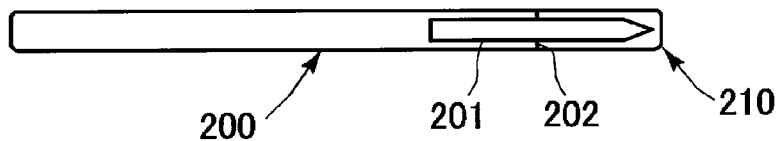
FIG. 15B is a schematic diagram illustrating a side view of the card key shown in FIG. 15A.
Figure 15C:
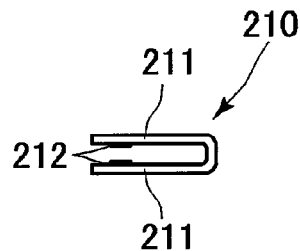
FIG. 15C is a schematic diagram illustrating a side view of the cell case of the card key shown in FIG. 15A.
Figure 16:
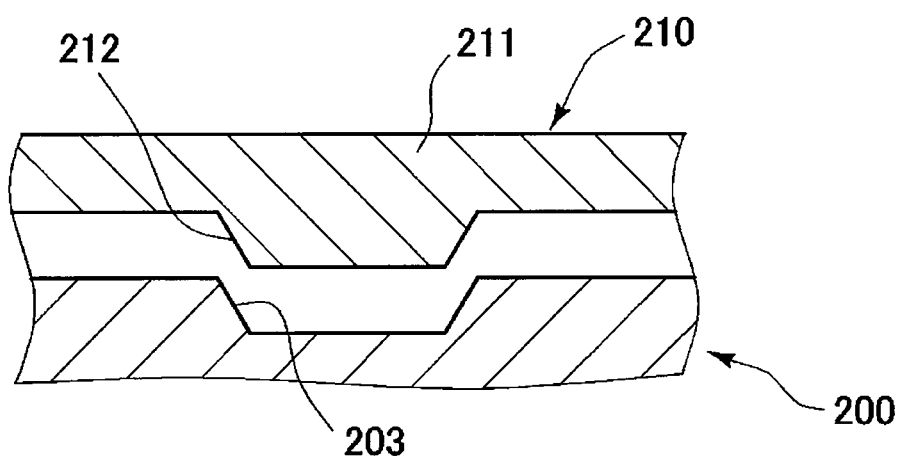
FIG. 16 is a diagram illustrating an enlarged cross-sectional view of a part of an engagement projection and an engagement recess of the card key shown in FIGS. 15A to 15C.

In the first to third embodiment described above, each of the cover engagement portions and the body engagement portions has the circular shape in the planar view, and is disposed at two locations. However, the shape and the number of the cover engagement portions and the body engagement portions may not be particularly limited. For example, as in the fourth example shown in FIG. 13, the card key body 2 may have an engagement recess 51, as the body engagement portion, on a cover fixing portion 50 at one location, and the cell cover 5 may have an engagement projection 52 on the inner wall surface of the second end portion 5b at one location to correspond to the engagement recess 51. The engagement recess 51 has a rectangular shape in the planar view. The engagement projection 52 has a rectangular shape in the planar view.

The outer shape of the card key and the location of accommodating the cell in the card key body are not limited to the structures described in the embodiments. In the embodiments, the button-type cell is exemplified as the cell accommodated in the card key body. The button-type cell is meant to include a coin-type cell and a miniature cell, in addition to a cell having a button shape. Further, the present disclosure may be applied to any card key accommodating a cell other than such a button-type cell as a power source of the circuit board.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A card key comprising:
a card key body including a circuit board on which an electronic component for performing a wireless communication with an on-board device is mounted, a cell accommodation portion for accommodating a cell that supplies an electric power to the circuit board, and a body engagement portion; and
a cell cover disposed to be detachable from the card key body to open and close the cell accommodation portion by being slid relative to the card key body, wherein
the cell cover has a U-shape in cross-section including a first side portion, a second side portion and a connecting portion connecting the first side portion and the second side portion,
the first side portion is deformable,
the second side portion has a cover engagement portion on a surface thereof opposed to the card key body to engage with the body engagement portion,
each of the body engagement portion and the cover engagement portion has an engagement contact surface that defines an angle in a range of 90°±45° relative to a direction of sliding of the cell cover in a mutually engaged state, and
the card key body has an interference escape portion that allows deformation of the first side portion by avoiding an interference with the second side portion in a state where the cell cover is attached to the card key body, thereby to enable the cell cover to be pulled out from the card key body.

2. The card key according to claim 1, wherein
the body engagement portion has a contact surface that is parallel to the direction of sliding of the cell cover and contacts an inner wall surface of the second side portion in the state where the cell cover is attached to the card key body.

3. The card key according to claim 1, wherein
the interference escape portion is provided by an escape sloped surface that is sloped relative to the direction of sliding of the cell cover and has a function of guiding slide-attaching of the cell cover to the card key body.

4. The card key according to claim 3, wherein
the body engagement portion is disposed on an extended line of the escape sloped surface along a direction of slide-attaching of the cell cover.

5. The card key according to claim 3, wherein
the cover engagement portion is disengaged from the body engagement portion in a state where the inner wall surface of the second side portion is at least in surface-contact with the escape sloped surface.

6. The card key according to claim 1, wherein
the cover engagement portion is disposed at each of ends of the second side portion in a width direction of the cell cover perpendicular to the direction of sliding of the cell cover, and
the body engagement portion is correspondingly provided for the cover engagement portion.

7. The card key according to claim 1, wherein
the cover engagement portion is provided by an engagement projection having a shape of projection,
the body engagement portion is provided by an engagement recess having a shape of recess, and
surfaces of the cover engagement portion and the body engagement portion facing in a direction of pulling-out of the cell cover provide the engagement contact surfaces.

8. The card key according to claim 7, wherein
a surface of the engagement projection facing in a direction opposite to the direction of pulling-out of the cell cover is sloped relative to the direction of sliding of the cell cover, and provides a guiding sloped surface for guiding slide-attaching of the cell cover to the card key body.

* * * * *